United States Patent
Murphy et al.

(10) Patent No.: US 9,010,209 B2
(45) Date of Patent: Apr. 21, 2015

(54) SCISSORS GEAR ASSEMBLY

(75) Inventors: Brian J. Murphy, Morton, IL (US); Anthony K. Chan, Peoria, IL (US); Michael P. Harmon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 498 days.

(21) Appl. No.: 13/412,085

(22) Filed: Mar. 5, 2012

(65) Prior Publication Data

US 2013/0228029 A1 Sep. 5, 2013

(51) Int. Cl.
*F16H 55/18* (2006.01)
*F16H 55/12* (2006.01)
*F16H 55/14* (2006.01)

(52) U.S. Cl.
CPC ............... *F16H 55/18* (2013.01); *F16H 55/12* (2013.01); *F16H 55/14* (2013.01); *Y10T 74/19907* (2015.01)

(58) Field of Classification Search
USPC .................. 74/409, 440, 443, 439; 123/90.31
See application file for complete search history.

(56) References Cited

U.S. PATENT DOCUMENTS

| | | | |
|---|---|---|---|
| 3,365,973 A | 1/1968 | Henden | |
| 3,648,534 A | 3/1972 | Fagarazzi | |
| 4,640,147 A | 2/1987 | Yasukawa et al. | |
| 4,719,813 A | 1/1988 | Chalik | |
| 4,745,823 A * | 5/1988 | Morita et al. | 74/409 |
| 5,056,613 A * | 10/1991 | Porter et al. | 180/178 |
| 5,979,259 A * | 11/1999 | Shook et al. | 74/409 |
| 5,979,260 A | 11/1999 | Long | |
| 6,247,377 B1 | 6/2001 | Long et al. | |
| 6,293,166 B1 | 9/2001 | Genter et al. | |
| 6,661,986 B2 * | 12/2003 | Kitayama | 399/167 |
| 7,086,302 B2 | 8/2006 | Ask et al. | |
| 7,658,124 B2 * | 2/2010 | Brosowske et al. | 74/440 |
| 7,752,937 B1 * | 7/2010 | Dornan | 74/409 |
| 2010/0139431 A1 | 6/2010 | Park | |

FOREIGN PATENT DOCUMENTS

| | | |
|---|---|---|
| JP | 59026662 | 2/1984 |
| JP | 59080563 | 5/1984 |
| JP | 06307504 | 11/1994 |
| JP | 06331004 | 11/1994 |
| JP | 2001132823 | 5/2001 |
| KR | 1020070007464 | 1/2007 |

\* cited by examiner

*Primary Examiner* — William Kelleher
*Assistant Examiner* — Thomas Magnuson
(74) *Attorney, Agent, or Firm* — John W. Stankiewicz; BakerHostetler

(57) ABSTRACT

A gear assembly including a main gear including a first hub, a first gear ring positioned about the first hub, and a first helically splined region. The gear assembly further includes a sub-gear co-axially disposed relative to the main gear with a resilient member disposed therebetween. The sub-gear including a second hub, a second gear ring positioned about the second hub, and a second helically splined region complementary to the first helically splined region.

18 Claims, 4 Drawing Sheets

SCISSORS GEAR ASSEMBLY

TECHNICAL FIELD

The present disclosure relates to a gear assembly for use in a gear train, and more particularly to a scissor gear assembly for improving performance in the gear train

BACKGROUND

Gear trains are widely used for transmission of rotational motion in a variety of applications including engine systems. However, significant noise may result from impacting, and clattering gear teeth of adjacent gears in a gear train. Generally, the noise is generated when gear teeth of adjacent gears come out of mesh and are then forced back into mesh, e.g., when a tooth on a first gear comes out of mesh by moving forward more quickly than an adjacent tooth on a second gear and then having the tooth on the first gear impacts the adjacent tooth on the second gear. Noises generated from the gear train not only make the environment uncomfortable, the impacts between gear teeth also result in premature wear of the gear train.

U.S. Pat. No. 6,247,377 (the '377 patent) discloses a scissor gear assembly to minimize the noise generated in gear trains. The scissor gear assembly, as described in the '377 patent, includes a first gear with first teeth, and a second gear with second teeth corresponding to the first teeth of the first gear. The first gear and the second gear are co-axially positioned and adapted to rotate relative to each other. Further, a plurality of springs are positioned between the first gear and the second gear in a tangential direction, which provides a spring bias force to rotate the first and second gears relative to each other and change the alignment of the first teeth and the second teeth. The first teeth and the second teeth operate together as composite teeth with a variable effective teeth thickness. The composite teeth reduce or effectively eliminate a gap while meshing with an adjacent gear and as a result reduce noise.

SUMMARY

In an aspect, the present disclosure provides a gear assembly including a main gear, a sub-gear, and a resilient member axially disposed between the main gear and the sub-gear. The main gear includes a first hub, a first gear ring positioned about the first hub, and a first helically splined region. The sub-gear is co-axially disposed relative to the main gear. Further, the sub-gear includes a second hub, a second gear ring positioned about the second hub, and a second helically splined region complementary to the first helically splined region.

Other features and aspects of this disclosure will be apparent from the following description and the accompanying drawings.

DETAILED DESCRIPTION

Figure 1:
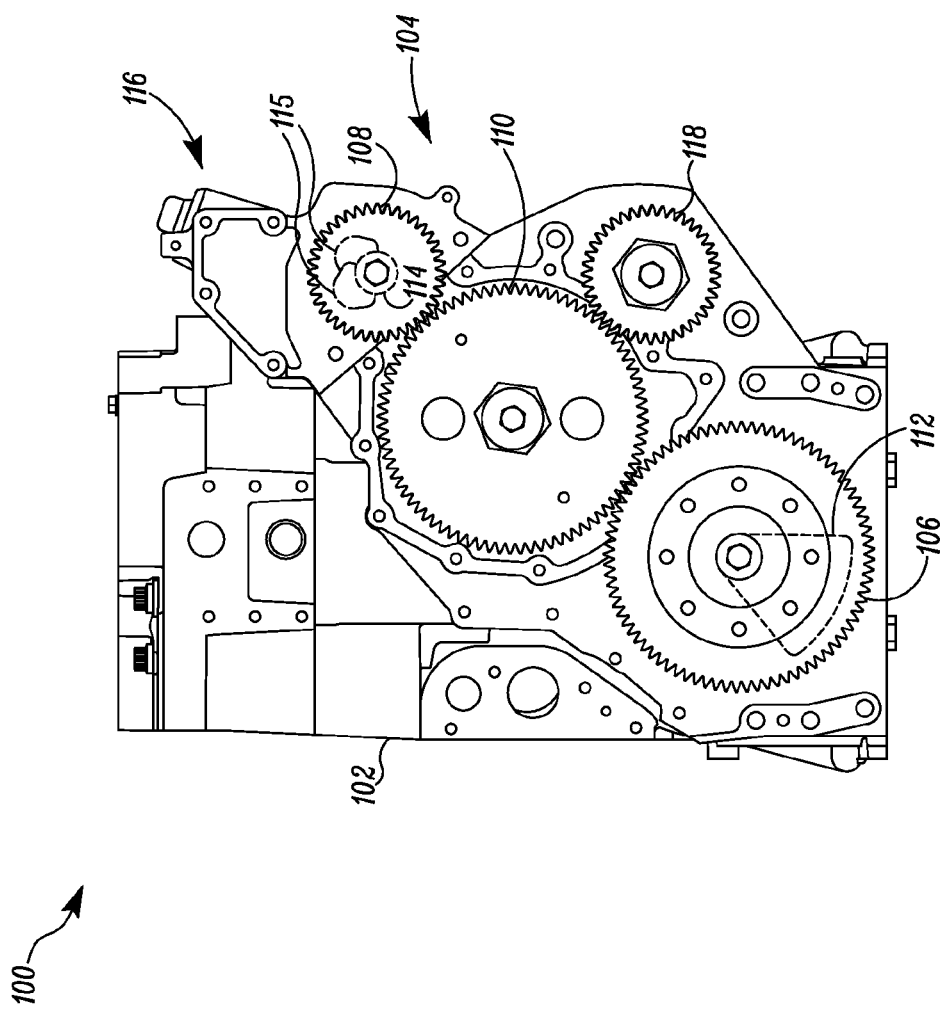
FIG. 1 illustrates an engine system.

The present disclosure describes a scissor gear assembly for use in gear trains. According to an aspect of the present disclosure, the scissor gear assembly improves the performance of the gear train and also substantially reduces the noise while meshing with an adjacent gear in the gear train during operation. FIG. 1 illustrates an engine system 100, according to an embodiment of the present disclosure. The engine system 100 includes an engine 102, and a gear train 104 associated with the engine 102. The engine 102 may be any type of combustion engine, e.g., a spark-ignited internal combustion engine, a compression ignition internal combustion engine, for example a diesel engine, can be of any size, with any number of cylinders, and in any configuration ("V," in-line, radial, etc.). The engine 102 may be used to power any machine or other device, including on-highway trucks or vehicles, off-highway trucks or machines, earth moving equipment, generators, aerospace applications, locomotive applications, marine applications, pumps, stationary equipment, or other engine powered applications.

In an embodiment, the gear train 104 may include a drive gear 106, a gear assembly 108, and an idler gear 110. The drive gear 106 may be coupled to a crankshaft 112 of the engine 102, which is in turn coupled with pistons and rotatable in a conventional manner. Further, the gear assembly 108 may be rotatably coupled with the drive gear 106 via the idler gear 110. The idler gear 110 may maintain a relative timing between the drive gear 106 and the gear assembly 108, such that any engine functions actuated by the gear assembly 108 take place at a pre-determined time relative to the rotation of the crankshaft 112. Although, the engine system 100 is shown having a single idler gear 110, in other embodiments, based upon the design and application of the engine system 100, multiple idler gears can be used.

In an embodiment, the gear assembly 108 is coupled to a camshaft 114 having a plurality of cams 115 to drive a fuel pump 116. The fuel pump 116 may include a reciprocating fuel pump including one or more reciprocating plungers operatively connected to the plurality of cams 115 provided on the camshaft 114. It may be apparent to a person skilled in the art that the pressurized fuel from the fuel pump 116 may be received in a common rail/manifold (not shown) and supplied to a plurality of fuel injectors associated with the engine 102. In another embodiment, the engine system 100 may include unit fuel injectors which may be operatively connected to the plurality of cams 115 for actuation. In an embodiment, the gear train 104 may further include an air compressor gear 118 rotatably coupled with the idler gear 110 to drive an air compressor (not shown) associated with engine system 100. The air compressor may include a reciprocating or rotary screw type pump.

Figure 2:
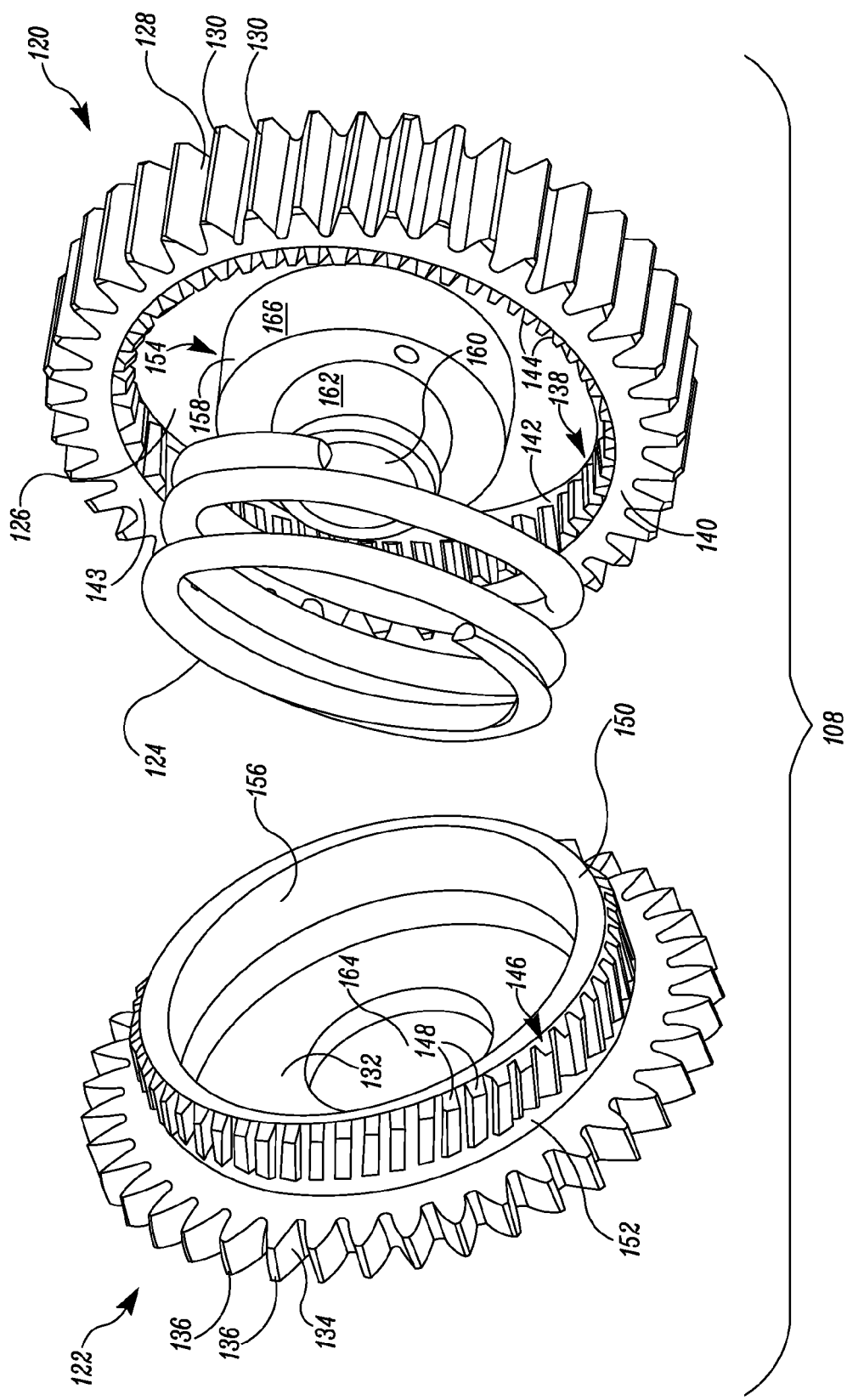
FIG. 2 illustrates a disassembled view of a gear assembly according to an aspect of the present disclosure.

FIG. 2 illustrates a disassembled view of the gear assembly 108 of FIG. 1. The gear assembly 108 includes a main gear 120, a sub-gear 122 co-axially disposed relative to the main gear 120, and a resilient member 124 axially disposed between the main gear 120 and the sub-gear 122. As illustrated, the resilient member 124 may include a helical spring, however in other alternative embodiments the resilient member may include one or more belleville springs, a conical coil spring, or any other suitable means adapted to exert an axial force between the main gear 120 and the sub-gear 122. It may be understood a person skilled in the art that the term "axially" refers to a longitudinal axis passing through both the centers of the main gear 120 and the sub-gear 122 when the gear assembly 108 is assembled.

The main gear 120 may include a first hub 126, and a first gear ring 128 disposed about the first hub 126. In an embodiment, the first gear ring 128 may include a spur gear having a plurality of equally spaced circumferentially disposed first teeth 130. The sub-gear 122 may include a second hub 132, a second gear ring 134 disposed about the second hub 132. The second gear ring 134 may also include a spur gear having a plurality of equally spaced circumferentially disposed second teeth 136. Moreover, in this embodiment the first teeth 130 of the main gear 120 and the second teeth 136 of the sub-gear 122 are equal in number and have substantially identical profile. The main gear 120 and the sub-gear 122 may be manufactured from metallic alloys, cast iron, composites, plastics, or any well know material.

The main gear 120 may further include a first helically splined region 138. The main gear 120 may also include a first flange 140 axially extending from the first hub 126, such that the first helically splined region 138 may be circumferentially disposed on a first internal surface 142 of the first flange 140. The first helically splined region 138 may include a series of helical splines 144. Further, as illustrated in FIG. 2, the first gear ring 128 may be circumferentially disposed about a first outer surface 143 of the first flange 140. The sub-gear 122 may further include a second helically splined region 146 having a series of helical splines 148 complementary to the series of helical splines 144 of the first helically splined region 138. The sub-gear 122 may also include a second flange 150 axially extending from the second hub 132, such that the second helically splined region 146 may be circumferentially disposed on a second outer surface 152 of the second flange 150.

Although not shown, alternative embodiments include substantially reversed configurations wherein the first helically splined region 138 may be provided partially on the first outer surface 143 of the first flange 140 and the second helically splined region 146 may be provided on a second internal surface 156 of the second flange 150. Further, it may be understood that, in this case, the first flange 140 may have an outer diameter substantially equal to an internal diameter of the second flange 150. Moreover, the first gear ring 128 may be partially disposed on the first outer surface 143 of the first flange 140 or on another flange with larger diameter, axially extending from the first hub 126.

Referring again to the embodiment illustrated in FIG. 2, the gear assembly 108 may further include a concentric boss 154 axially disposed between the main gear 120 and the sub-gear 122. In the illustrated embodiment, the concentric boss 154 may include a stepped shaft 158 integrally formed with the main gear 120, and have a through bore 160. A first shaft surface 162 of the stepped shaft 158 may be configured to be received in a through hole 164 provided on the second hub 132 of the sub-gear 122. Alternatively, the concentric boss 154 may include a straight shaft, or a tapered shaft.

Figure 3:
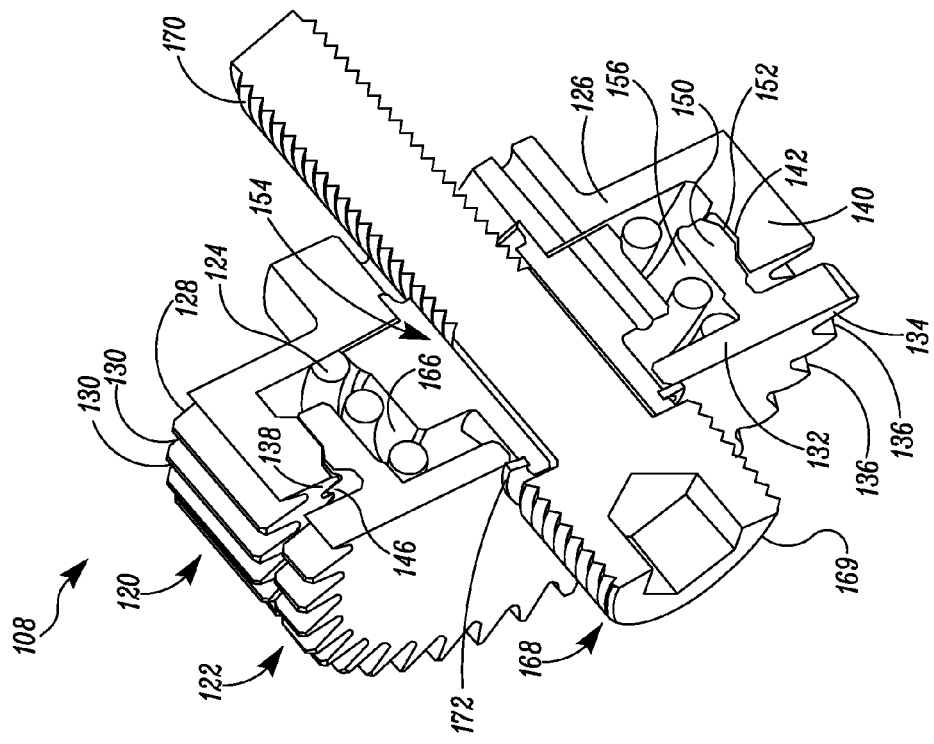
FIG. 3 illustrates a cross-sectional view of the gear assembly of FIG. 2 in an assembled state.
Figure 4:
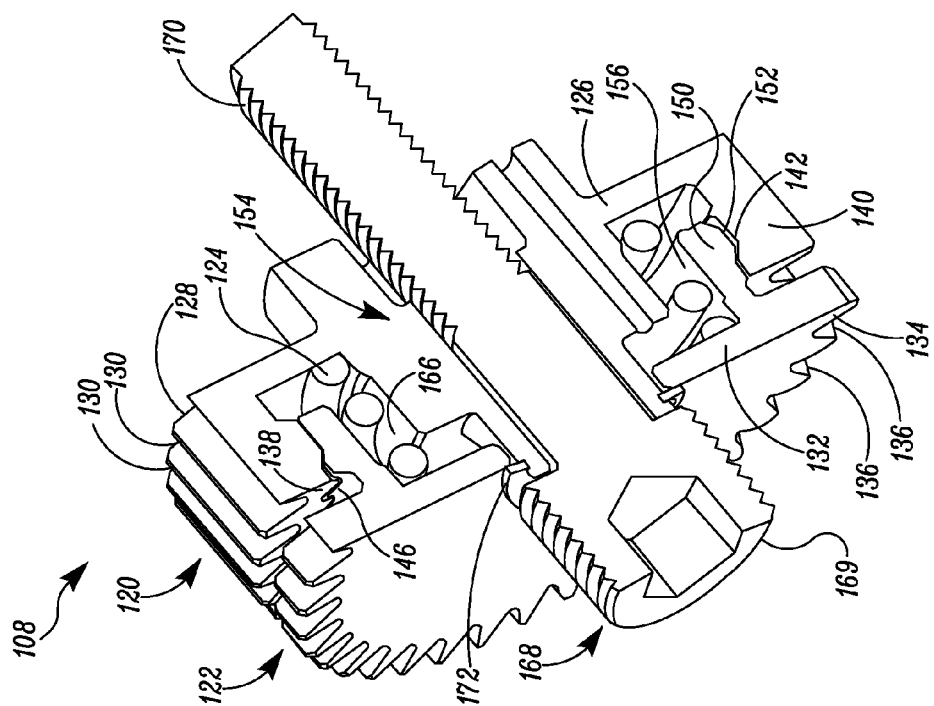
FIG. 4 illustrates a cross-sectional view of another embodiment of a gear assembly in an assembled state.

Referring now to FIGS. 3 and 4 which illustrate cross-sectional views of the gear assembly 108 in the assembled state wherein the resilient member 124 may be disposed between the concentric boss 154 and the second internal surface 156 of the second flange 150. The resilient member 124 may surround a second shaft surface 166 of the stepped shaft 158. As illustrated in FIG. 4, the concentric boss 154 may be made divisibly from the first hub 126, accordingly the main gear 120, the sub-gear 122, and the concentric boss 154 may be attached together, e.g., by one or more fastening screws or bolts during the assembly. Further, a retaining clip 172 may be provided to hold the main gear 120, the sub-gear 122, and/or the concentric boss 154 together in the assembled state when the resilient member 124 is in a compressed stage. As the retaining clip 172 holds the main gear 120 and the sub-gear 122 together, the one or more fastening screws or bolts may be removed in the assembled state.

Moreover, a fastening member 168, such as a bolt, may be received in the through bore 160 of the concentric boss 154. Further, the fastening member 168 may include an externally threaded head portion 169, and a free end 170. The free end 170 of the fastening member 168 may to attachable to the camshaft 114 to assemble the gear assembly 108 in the gear train 104 (see FIG. 1).

INDUSTRIAL APPLICABILITY

The engine system 100 described above may impart dynamic torques in the gear train 104 during the operation thereof. Further, it is common for each of the drive gear 106 and gear assembly 108 to experience impulsive accelerations and decelerations during their operation, e.g., due to impulsive loading of the pump 116, camshaft 114, etc. Moreover, the reciprocating plungers of the fuel pump 116 may apply a temporary torque reversal on the camshaft 114 and, hence, on the gear assembly 108. Particularly, in case of a high pressure common rail fuel pump, the rotational speed of the camshaft 114 may vary in a magnitude of about 40 to 65 revolutions per minute from an average rotational speed due to the torque reversals from the fuel pump 116.

Torque transfer through a conventional gear train with significant backlash, may cause the adjacent teeth of meshed gears to collide within the gear train. For example, a cam gear, such as the gear assembly 108 of the gear train 104, may experience torque impulses, and clatter intensely back and forth with an idler gear, such as the idler gear 110. The noise, such as "hammering" sounds associated with the engine systems, particularly for heavy-duty diesel engines, is primarily due to the impact noise generated in the gear train 104.

Figure 5:
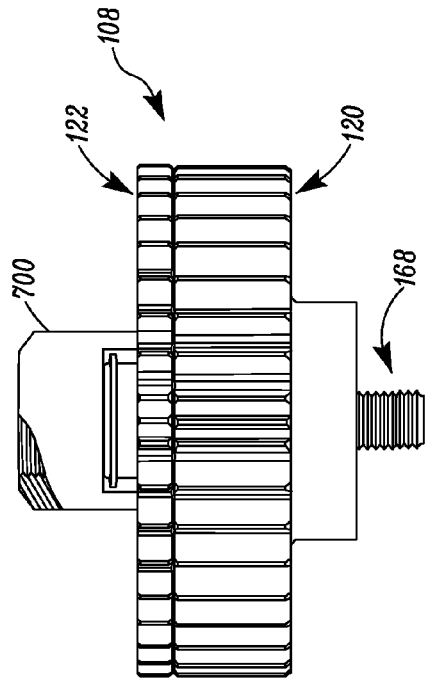
FIG. 5 illustrates the gear assembly in a normal mounting position within a gear train.
Figure 6:
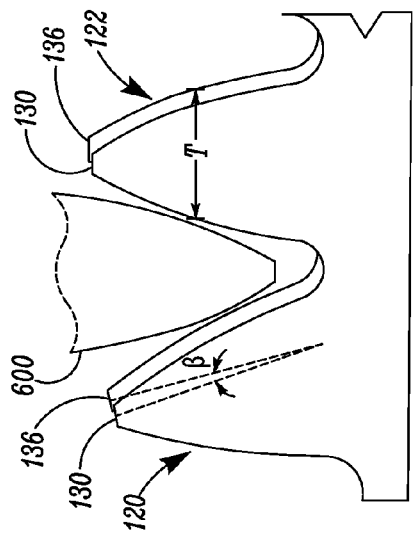
FIG. 6 illustrates a sectional view of gear teeth of the gear assembly of FIG. 5 engaged with another gear of the gear train.

The gear assembly 108, according to an aspect of the present disclosure, improves the performance of the gear train 104. FIG. 5 illustrates the gear assembly 108 in a normal mounting position within the gear train 104. Under the action of the axial force from the resilient member 124, the first helically splined region 138 of the main gear 120 may move on the second helically splined region 146 of the sub-gear 122. Therefore, the sub-gear 122 may angularly move relative to the main gear 120 by means of the first helically splined region 138 and the second helically splined region 146. Further, as illustrated in FIG. 6, in the normal mounting position the second teeth 136 of the sub-gear 122 may be partially superimposed with the first teeth 130 of the main gear 120 with a positive angular displacement $\alpha$ in the anti-clockwise direction, e.g., corresponding to the direction of the rotation of the gear assembly 108. In an embodiment of the present disclosure, the positive angular displacement $\alpha$ may be in a range of about 0.60° to about 0.90°. The positive angular displacement $\alpha$ may increase an effective tooth thickness T of the gear assembly 108, such that a gear tooth 600 of an adjacent gear, for example the idler gear 110, may be clamped between the first teeth 130 and the second teeth 136 of the main gear 120 and the sub-gear 122, respectively. Consequently, the effective backlash between the main gear 120 and sub-gear 122 in combination and the adjacent gear, such as the idler gear 110, is minimized and noise is reduced.

Moreover, the resilient member 124 of the gear assembly 108 may provide a bias torque to absorb any temporary torque reversals originating from the fuel pump 116 and the crankshaft 112, during the operation of the engine system 100. The bias torque may be selected based on the design and expected loading conditions of the engine 102. In an aspect of the present disclosure, the resilient member 124 may provide the bias torque in a range of about 130 N-m to about 600 N-m.

Figure 7:
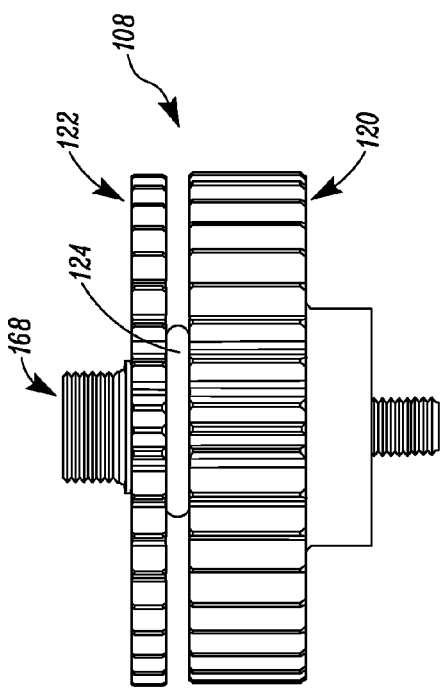
FIG. 7 illustrates the gear assembly in a compressed position.
Figure 8:
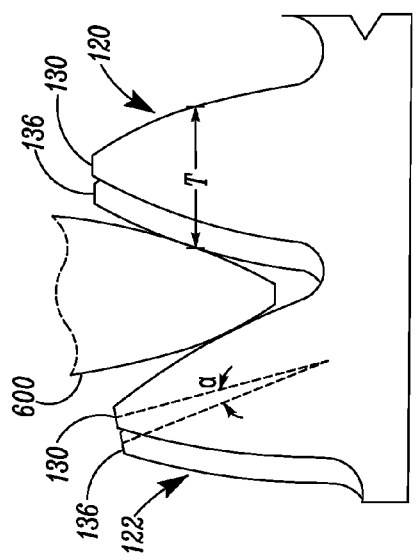
FIG. 8 illustrates a sectional view of gear teeth of the gear assembly of FIG. 7 engaged with another gear of the gear train.

Referring now to FIG. 7, the gear assembly 108 may include a nut 700, according to another aspect of the present disclosure. The nut 700 may be fastened to the head portion 169 of the fastening member 168, and adapted to be rotatable by any known conventional means. As the nut 700 is screwed over the head portion 169 of the fastening member 168, the sub-gear 122 may move axially towards the main gear 120 against the axial force of the resilient member 124. Consequently, the second teeth 136 may move in clockwise direction relative to the first teeth 130 by a negative angular displacement β. As illustrated in FIG. 8, the negative angular displacement β may be in a range of about 0.30° to about 0.50°. The negative angular displacement β may decrease the effective tooth thickness T of the gear assembly 108, such that the gear tooth 600 of the adjacent gear may be easily installed in or removed from the gear assembly 108. Moreover, having a less number of components in the gear assembly 108, namely the main gear 120, the sub-gear 122, the resilient member 124, and the fastening member 168 also reduces installation and disassembling efforts for the gear assembly 108.

Aspects of this disclosure may also be applied to other engine systems and machines having one or more gear trains. In another embodiment of the present disclosure, the air compressor gear 118 may include a scissor gear assembly, such as gear assembly 108. Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A gear assembly comprising:
a main gear including a first hub, a first gear ring positioned about the first hub, and a first helically splined region;
a sub-gear co-axially disposed relative to the main gear, the sub-gear including a second hub, a second gear ring positioned about the second hub, and a second helically splined region complementary to the first helically splined region wherein the sub-gear further includes a flange axially extending from the second hub, the flange having a second internal surface and a second outer surface;
a resilient member axially disposed between the main gear and the sub-gear, and radially disposed inward relative to the first helically splined region; and
a concentric boss axially disposed between the main gear and the sub-gear, wherein the resilient member substantially surrounds the concentric boss.

2. The gear assembly of claim 1, wherein the resilient member includes a helical spring.

3. The gear assembly of claim 1, wherein the main gear further includes a flange axially extending from the first hub, the flange having a first internal surface.

4. The gear assembly of claim 3, wherein the first internal surface includes the first helically splined region.

5. The gear assembly of claim 1, wherein the second outer surface includes the second helically splined region.

6. The gear assembly of claim 1, wherein the concentric boss includes a through bore configured to receive a fastening member.

7. The gear assembly of claim 1, wherein the second hub includes a through hole configured to partially receive the concentric boss.

8. The gear assembly of claim 1, wherein the concentric boss is integral with the first hub.

9. The gear assembly of claim 1, further including a retaining clip to hold the main gear, and the sub-gear together.

10. A gear train for an engine system comprising:
a drive gear;
an idler gear coupled to the drive gear; and
a gear assembly rotatably coupled with the drive gear via the idler gear, the gear assembly comprising:
a main gear including a first hub, a first gear ring positioned about the first hub, and a first helically splined region;
a sub-gear co-axially disposed relative to the main gear, the sub-gear including a second hub, a second gear ring positioned about the second hub, and a second helically splined region complementary to the first helically splined region wherein the sub-gear further includes a flange axially extending from the second hub, the flange having a second internal surface and a second outer surface;
a resilient member axially disposed between the main gear and the sub-gear, and radially disposed inward relative to the first helically splined region; and
a concentric boss axially disposed between the main gear and the sub-gear, wherein the resilient member substantially surrounds the concentric boss.

11. The gear train of claim 10, wherein the resilient member includes a helical spring.

12. The gear train of claim 10, wherein the main gear further includes a flange axially extending from the first hub, the flange having a first internal surface.

13. The gear train of claim 12, wherein the first internal surface includes the first helically splined region.

14. The gear train of claim 10, wherein the second outer surface includes the second helically splined region.

15. The gear train of claim 10, wherein the concentric boss includes a through bore configured to receive a fastening member, the fastening member configured to attach the gear assembly with a camshaft associated with the engine system.

16. An engine system comprising:
an engine having a crankshaft, and a camshaft; and
a gear train associated with the engine, the gear train comprising:
a drive gear coupled with the crankshaft of the engine;
an idler gear coupled to the drive gear; and
a gear assembly coupled to the camshaft of the engine and rotatably coupled with the drive gear via the idler gear, the gear assembly comprising:
a main gear including a first hub, a first gear ring positioned about the first hub, and a first helically splined region;
a sub-gear co-axially disposed relative to the main gear, the sub-gear including a second hub, a second gear ring positioned about the second hub, and a second helically splined region complementary to the first helically splined region wherein the sub-gear further includes a flange axially extending from the second hub, the flange having a second internal surface and a second outer surface;

a resilient member axially disposed between the main gear and the sub-gear, and radially disposed inward relative to the first helically splined region; and a concentric boss axially disposed between the main gear and the sub-gear, wherein the resilient member substantially surrounds the concentric boss.

17. A gear assembly comprising:

a main gear including a first hub, a first gear ring positioned about the first hub, and a first flange axially extending from the first hub, the first flange having a first internal surface including a first helically splined region;

a sub-gear co-axially disposed relative to the main gear, the sub-gear including a second hub, a second gear ring positioned about the second hub, and a second helically splined region complementary to the first helically splined region; and a resilient member axially disposed between the main gear and the sub-gear, the resilient member disposed radially inward relative to the first internal surface of the first flange and configured to abut a portion of the first hub.

18. A gear assembly comprising:

a main gear including a first hub, a first gear ring positioned about the first hub, and a first helically splined region;

a sub-gear co-axially disposed relative to the main gear, the sub-gear including a second hub, a second gear ring positioned about the second hub, and a second flange axially extending from the second hub, the second flange having a second internal surface and a second outer surface, wherein the second outer surface includes a second helically splined region complementary to the first helically splined region; and a resilient member axially disposed between the main gear and the sub-gear, the resilient member disposed radially inward relative to the second internal surface of the second flange and configured to abut a portion of the first hub.

* * * * *